(12) United States Patent
Lindgren

(10) Patent No.: US 9,545,865 B2
(45) Date of Patent: Jan. 17, 2017

(54) TRUCK-LOADING DEVICE

(71) Applicant: Donald Lindgren, Chicago, IL (US)

(72) Inventor: Donald Lindgren, Chicago, IL (US)

( * ) Notice: Subject to any disclaimer, the term of this patent is extended or adjusted under 35 U.S.C. 154(b) by 0 days.

(21) Appl. No.: 14/796,694

(22) Filed: Jul. 10, 2015

(65) Prior Publication Data

US 2016/0009212 A1 Jan. 14, 2016

Related U.S. Application Data

(60) Provisional application No. 62/022,752, filed on Jul. 10, 2014.

(51) Int. Cl.
*B60P 1/00* (2006.01)
*B60P 1/64* (2006.01)
*B60R 13/01* (2006.01)

(52) U.S. Cl.
CPC .............. *B60P 1/003* (2013.01); *B60P 1/6427* (2013.01); *B60R 13/013* (2013.01)

(58) Field of Classification Search
CPC ............ B60P 1/00; B60P 1/003; B60P 1/006; B60P 1/64; B60P 1/6427; B60R 13/011; B60R 13/013; B60R 13/01; B60R 2011/008; B60R 2011/0084
USPC . 296/26.1, 26.11, 26.09, 39.2; 224/403–405, 281, 496, 510; 414/467, 522, 414/539
See application file for complete search history.

(56) References Cited

U.S. PATENT DOCUMENTS

| | | | | |
|---|---|---|---|---|
| 2,808,159 | A | * 10/1957 | Beltran Simo | ....... B60P 1/6454 414/499 |
| 5,624,223 | A | * 4/1997 | Lovato | ...................... B60P 1/00 414/480 |
| 7,338,104 | B1 | * 3/2008 | Bejin | ...................... B60P 1/003 224/403 |
| 9,033,642 | B2 | * 5/2015 | Pike | .......................... B60P 1/64 414/522 |
| 2006/0033377 | A1 | * 2/2006 | Frimel | ...................... B60P 1/52 298/1 A |

* cited by examiner

*Primary Examiner* — Michael McCullough
*Assistant Examiner* — Mark Hageman
(74) *Attorney, Agent, or Firm* — Richards Patent Law P.C.

(57) ABSTRACT

A cargo loading system for use with a truck bed including a first frame, a second frame connected to the first frame by a first hinge, and a third frame connected to the second frame by a second hinge. Each frame includes perimeter walls and a bottom wall that define a cargo space. The first frame includes wheels extending beyond the perimeter walls on a side of the cargo space opposite to the bottom wall. In a first configuration, the frames lie in parallel in the truck bed. In a second configuration, the third frame and the second frame lie in parallel in the truck bed, and the first frame freely hangs over an edge of the truck bed. In a third configuration, the third frame lies in the truck bed, the second frame hangs freely, and the one or more wheels engage a surface below the truck bed.

7 Claims, 5 Drawing Sheets

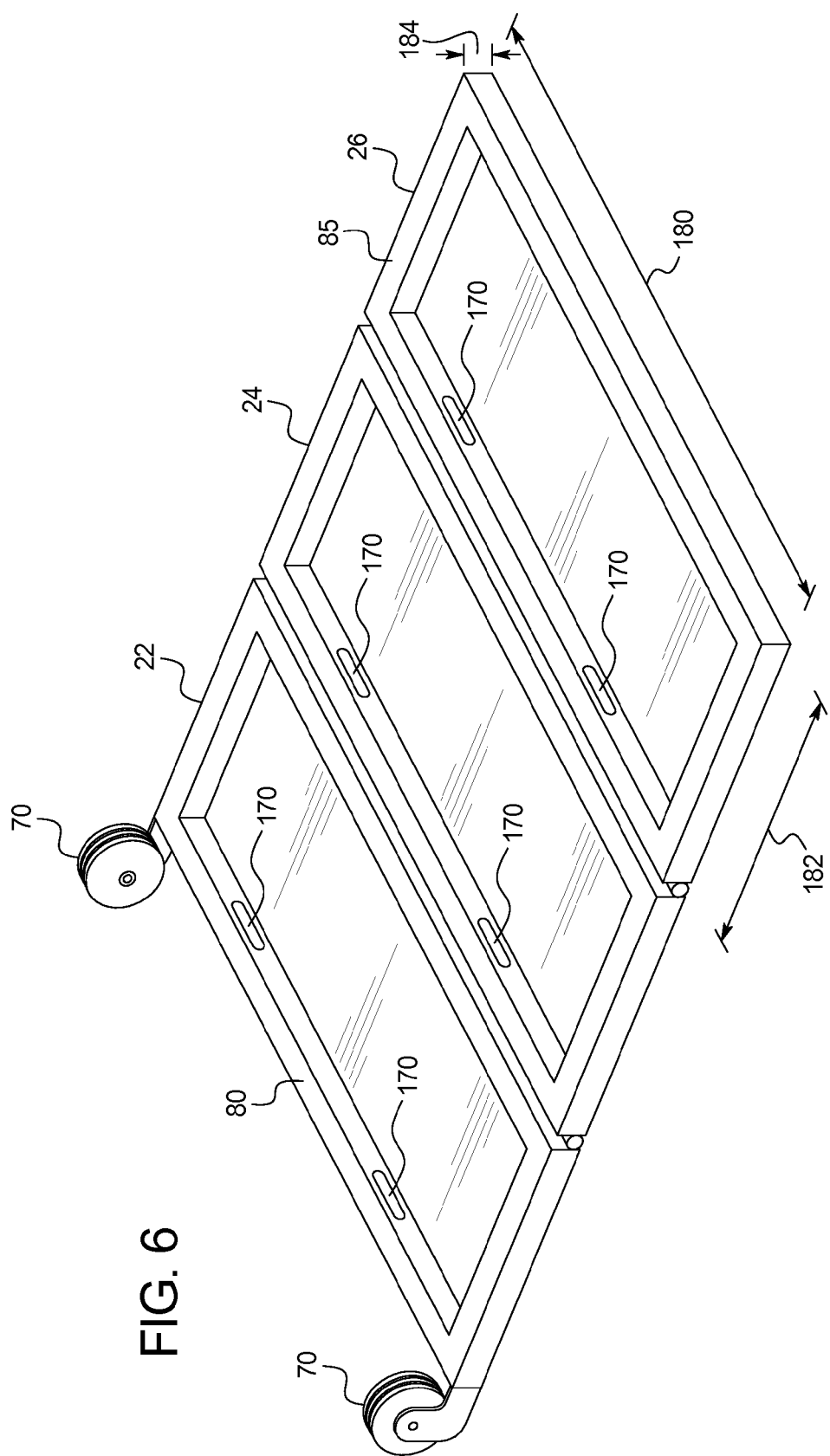

TRUCK-LOADING DEVICE

CROSS-REFERENCE TO RELATED APPLICATIONS

This application incorporates by reference and claims the benefit of priority to U.S. Provisional Patent Application No. 62/022,752 filed Jul. 10, 2014.

BACKGROUND OF THE INVENTION

The present subject matter relates generally to a device for loading and unloading cargo from a truck bed. More specifically, the present invention relates to a device for loading and unloading cargo that permits a user to easily load and unload cargo from the entire length truck bed using a series of interconnected and hinged frames on the tailgate.

To load a truck bed, a user typically sets the cargo on the tailgate, jumps up onto the tailgate, picks up the cargo again, walks it back into the truck, then walks back to the tailgate, then hops back down off the tailgate to pick up more cargo. Likewise, to unload a truck, the user jumps up on the tailgate, walks to the front of the truck bed, picks up the cargo, carries it back to the tailgate, hops down, and removes the cargo from the tailgate. Thus, there is a need for devices that permits a user to load and unload a truck bed without requiring the user to step up into and out of the truck bed.

Additionally, many trucks have tonneau covers or rigid top covers that need to be unzipped or lifted to get inside. In order to unload cargo, the user must get into the cargo space under the cover and crawl on his or her hands and knees to get at cargo on the back of the truck. Because the top cover makes the cargo space very cramped, unloading the cargo space can be very uncomfortable. Thus, there is an additional need for devices that permits a user to load and unload a truck bed without requiring the user to step up into and out of the truck bed.

Further, many types of cargo tend to move around in the truck bed while traveling. For example, groceries, small supplies, and loose items may all shift while traveling, creating a mess, and potentially damaging the transported goods. Thus, there is a need for devices that secure items in the truck bed while traveling.

Accordingly, there is a need for a truck-loading device, as described herein.

BRIEF SUMMARY OF THE INVENTION

To meet the needs described above and others, the present disclosure provides a cargo loading system in the form of a truck-loading device that includes a plurality of hinged frames that may be slid into and out of a truck bed to load and unload cargo. The truck-loading device makes it possible for users who are not able to jump into a truck to load or unload cargo. This provides greater use of the truck for users who are overweight, elderly, or have a physical impairment. The truck-loading device also saves effort and time when loading and unloading cargo.

The truck-loading device may include a plurality of hinged frames that may be slid into and out of a truck bed to load and unload cargo. The truck loading device, because of its hinging ability, may fold down and under the truck, keeping the truck-loading device out of the way of the user and making it possible for the user to pick up cargo on the tailgate in a straight standing position.

The truck-loading device may include multiple framed sections, or frames. The frames of the truck-loading device are hinged together by hinges in a sequence that may easily slide on the bed liner of a pickup truck. Each frame may be separately loaded and then slid back into the truck bed to permit the loading of the next frame. In an embodiment, each frame is adapted to fit in between the wheels wells of the truck and may be provided in two-foot sections to fit a truck width of four-, six-, or eight-ft. bed liner. In an embodiment, hinges link each of frames to at least one other frame. In an embodiment, each frame may include one or more connecting faces along the exterior of one or more of the perimeter walls along the frame length. The hinges may pivot between the connecting faces near the bottom walls.

The truck-loading device may be sized in various embodiments to match different truck beds. In an embodiment, each frame may have a frame depth of two feet and a frame length of four feet. In an embodiment, the truck-loading device may include two frames to fit a four-foot by four-foot truck bed. In another embodiment, the truck-loading device may include three frames for a four-feet by six-feet truck bed. In yet another embodiment, the truck-loading device may include four frames for a four-foot by eight-foot truck bed. Each embodiment may be modifiable allowing for the addition or removal of frames. In an embodiment, the frames may have a frame depth of four feet or less. If the frames have a frame depth greater than four feet, when a frame is hanging from the tailgate it may touch on the ground and drag, and thereby preventing the easy loading and unloading of the truck-loading device.

The perimeter walls may extend upwards from the bottom walls to a top side at a uniform frame height. The frame height may be sized to a height sufficient to keep cargo placed in the cargo space of a frame from rolling or shifting, but not so high as to take up valuable cargo space for other larger cargo to rest on top of the frames. In an embodiment, the frame height is between one to four inches high. The frames may be flush on the top side of the perimeter walls as to aid in loading and unloading cargo that spans across the frames, such as, sheets of plywood, dry wall, and paneling.

The frames may be adapted to minimize the sliding contact surface between the bottom of the frames and the truck bed to enable a user to move cargo that is six-eight feet away in the interior of the truck bed to the tailgate for unloading. This permits a user to unload a truck without having to "get off" his feet to unload the truck.

The truck-loading device may be adapted to be compatible with a truck bed that has a hard plastic corrugated bed liner. The hard corrugated bed liner reduces friction by providing a surface with fifty percent of its surface recessed. By reducing surface area, drag and friction are reduced.

In use, the user may load cargo by pulling out the truck-loading device until the third frame (or the rearmost frame if more than three frames are included) of the truck-loading device is on the tailgate. The user may then fill the third frame. Once the third frame is filled, the user may slide the third frame into the truck bed and fill the second frame on the tailgate. The user may continue filling frames until all cargo is loaded or all frames are loaded and moved into the truck bed.

The truck-loading device may also include special accessories. For example, in some embodiments, the truck-loading device may include buckles and strap to hold down cargo.

In an embodiment, the frame is constructed from plastic. A portion of the bottom surface may be recessed to facilitate less drag. The frame may include a support rib to increase the strength of the frame. In an embodiment, each frame may include perimeter walls and a bottom wall that define a cargo space to receive cargo. The perimeter walls may define the shape of the frame. In an embodiment, the shape of the frame may be rectangular.

In an embodiment, a frame may be constructed from metal tubes with a square cross-section. In an embodiment, the frame includes a plastic tray that may be set inside and fastened to the metal tubes. The bottom surface of the plastic tray may include a random embossed pattern that facilitates the least drag and maximum support.

In another embodiment, a frame may be constructed from wood boards. In the embodiment shown, the frame includes linear hard plastic slats attached to the bottom surface of the frame to permit the frame to slide freely.

To reduce drag, a slat surface of the plastic slat may include a surface area that is less than a surface area of the bottom surface. Additionally, the slat surface may extend along a direction of travel of the truck-loading device when moving between a first configuration and a second configuration.

In other embodiments, the bottom surface may include disc-shaped protrusions instead of plastic slats. In yet further embodiments, the bottom surface may include ribs. For example, in some embodiments, the bottom wall includes one or more ribs extending away from the cargo space, wherein each rib may be elongated along the bottom wall in a direction of travel. The direction of travel is the direction along which the truck-loading device moves when moving between the first configuration and the second configuration.

In some embodiments, the frames may also be used as billboards for advertising events by hanging the first frame off of the tailgate with a logo or ad printed within the cargo space. In some embodiments, the frames may include a foam interior and may be used separately as a floatation device.

In an embodiment, wheels (such as a caster) may be provided on the first frame to facilitate the rolling motion under the tailgate for use with truck beds that are six-feet long or longer. The wheels may extend above the plane defined by the height of the perimeter walls to ensure contact with the ground when the first frame is taken off the tailgate during unloading. Additionally, the frames may include handles. In an embodiment, the handles are defined by openings in the perimeter walls along the frame length. The handles may be provided on the interior or exterior of the perimeter walls.

In an embodiment shown, the truck-loading device includes a first frame, a second frame connected to the first frame by a first hinge, and a third frame connected to the second frame by a second hinge. Each frame includes perimeter walls and a bottom wall that define a partially enclosed cargo space. The first frame includes one or more wheels extending beyond the perimeter walls on a side of the cargo space opposite to the bottom wall.

In a first configuration, the user has opened the tailgate, and begins pulling on the first frame to pull it out onto the tailgate. In the first configuration, the first frame, the second frame, and the third frame lie in parallel in the truck bed. After the user has unloaded the cargo from the first frame, the truck-loading device is pulled out and the first frame is pulled over the tailgate.

In a second configuration, the second frame and the third frame lie in parallel in the truck bed, and the first frame freely hangs over the tailgate, if present, or an edge of the truck bed, if no tailgate is present. In the second configuration, the user may then easily unload the second frame.

After the second frame is unloaded, the truck-loading device may again be pulled further out to cause the second frame to pivot and hang from the tailgate. The wheels engage a surface below the truck and the first frame rolls underneath the truck bed. In this third configuration, the third frame lies in the truck bed, the second frame hangs over the edge of the truck bed, and the one or more wheels engage a surface below the truck bed. In the third configuration, the third frame may be easily unloaded.

Similarly, to fully load the truck bed, the process may be reversed. The cargo is first placed on the third frame in its position on the tailgate. Once the third frame is loaded, the second frame is lifted up to a position parallel to the truck bed, using the handles inside the second frame. The third frame and the second frame are then pushed into the truck bed with the first frame still hanging down at a ninety-degree angle to the truck bed. The second frame is now on the tailgate and may be loaded with cargo. The first frame may then be lifted to a position parallel to the truck bed, and pushed onto the tailgate. Once the first frame is loaded, the truck-loading device is fully pushed into the truck bed, at which point the tailgate may be lifted and closed.

In an embodiment, a cargo loading system for use with a truck bed includes a first frame, a second frame connected to the first frame by a first hinge, and a third frame connected to the second frame by a second hinge; wherein each frame includes perimeter walls and a bottom wall that define a partially enclosed cargo space, wherein the first frame includes one or more wheels extending beyond the perimeter walls on a side of the cargo space opposite to the bottom wall, wherein, in a first configuration, the first frame, the second frame, and the third frame lie in parallel in the truck bed, in a second configuration, the third frame and the second frame lie in parallel in the truck bed, and the first frame freely hangs over an edge of the truck bed, and in a third configuration, the third frame lies in the truck bed, the second frame freely hangs over the edge of the truck bed, and the one or more wheels engage a surface below the truck bed.

In some embodiments, the cargo loading system further includes a fourth frame connected to the third frame. In some embodiments, the first frame, the second frame, and the third frame include a depth of four feet or less. In some embodiments, each wall of the perimeter walls is a length of metal tube. In some embodiments, each wall of the perimeter walls is a beam of wood. In some embodiments, one or more of the perimeter walls includes handle openings. In some embodiments, the bottom wall includes a bottom surface including an embossed pattern.

In some embodiments, the bottom wall includes one or more ribs extending away from the cargo space, wherein each rib is elongated along the bottom wall in a direction of travel of the cargo loading system when moving between the first configuration and the second configuration.

In some embodiments, the bottom wall includes a bottom surface, wherein the bottom surface includes a linear slat including a slat surface parallel to the bottom surface, wherein the slat surface includes a surface area that is less than a surface area of the bottom surface, wherein the slat surface extends along a direction of travel of the cargo loading system when moving between the first configuration and the second configuration.

In some embodiments, the bottom wall includes a bottom surface, wherein the bottom surface includes disc-shaped protrusions extending from the bottom surface away from the cargo space.

An advantage of the invention is that it provides a truck-loading device that permits a user to load and unload a truck bed without requiring the user to step up into and out of the truck bed.

Another advantage of the invention is that it provides a truck-loading device that may be loaded and unloaded without undoing the truck box cover.

A further advantage of the invention is that it provides a truck-loading device that keeps cargo in place while traveling, and is easily take out of the truck when the truck needs to be used for another purpose.

Yet another advantage of the invention is that it provides a truck-loading device for users who are not able to jump into a truck to load or unload cargo. This provides greater use of the truck for users who are overweight, elderly, or have a physical impairment.

An even further advantage of the invention is that it provides a truck-loading device that saves effort and time when loading and unloading cargo.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 is a perspective view of another example of a truck-loading device.

DETAILED DESCRIPTION OF THE INVENTION

Figure 1:
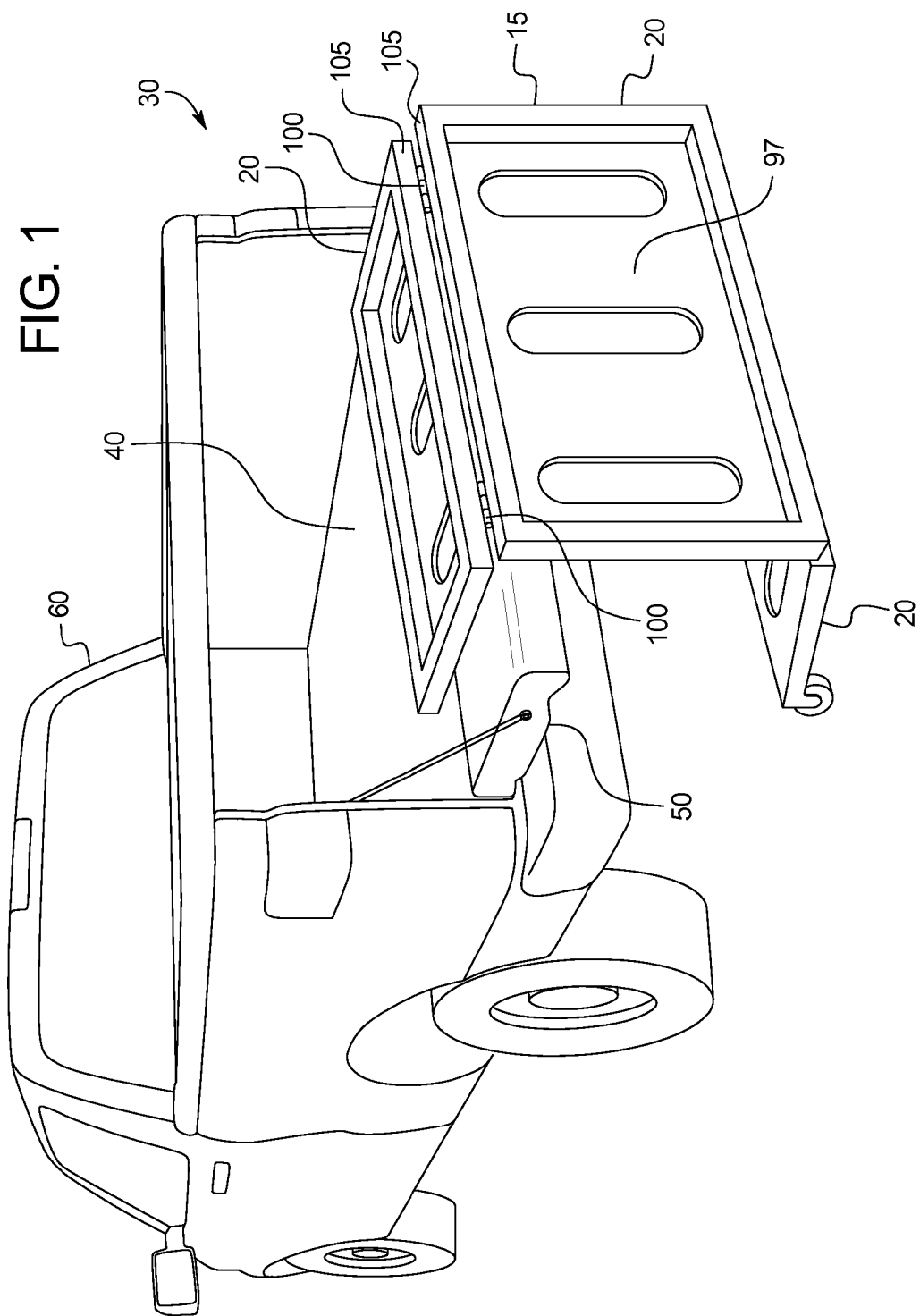
FIG. 1 illustrates an example of a truck-loading device.
Figure 7A:
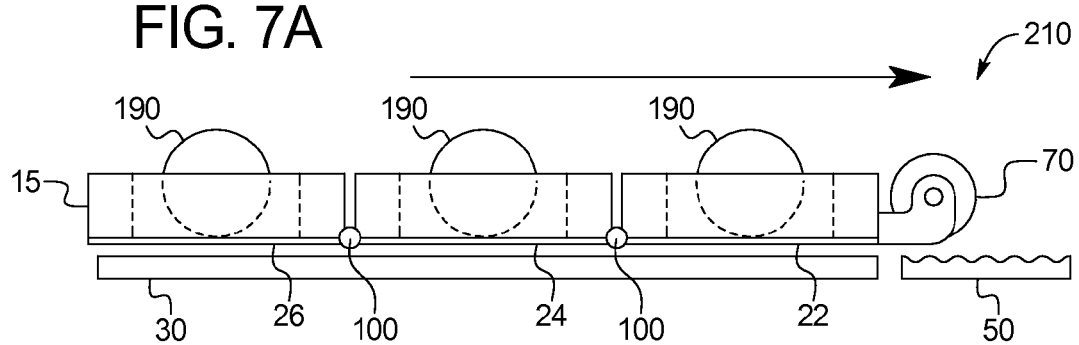
FIG. 7A illustrates a side view of the truck-loading device holding cargo in a first configuration ready for unloading.
Figure 7B:
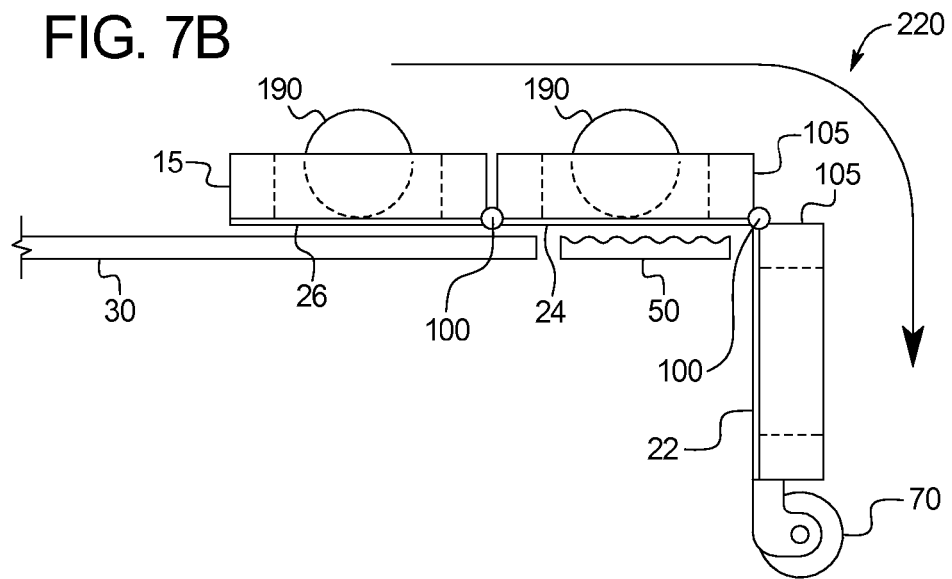
FIG. 7B illustrates a side view of the truck-loading device in a second configuration positioned for unloading the second frame after the first frame has been unloaded.
Figure 7C:
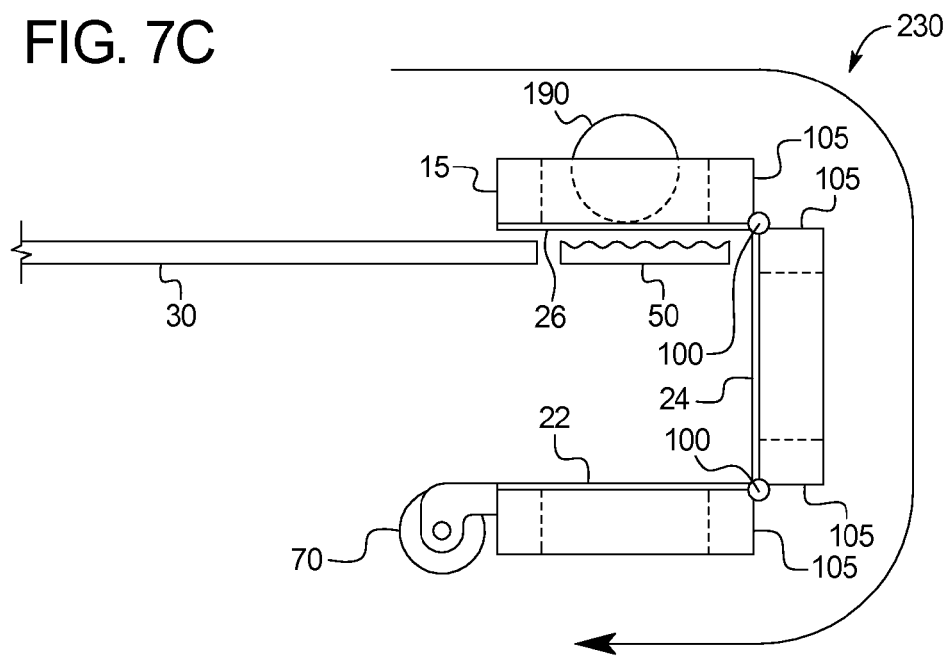
FIG. 7C illustrates a side view of the truck-loading device in a third configuration positioned for unloading the third frame.

FIG. 1 illustrates an example of a truck-loading device 15. As shown in FIG. 1, the truck-loading device 15 includes a plurality of hinged frames 20 that may be slid into and out of a truck bed 30 to load and unload cargo 190 (FIGS. 7A-7C). As shown in FIG. 1, the truck loading device 15, because of its hinging ability, folds down and under the truck 60, keeping the truck-loading device 15 out of the way of the user and making it possible for the user to pick up cargo 190 on the tailgate 50 in a straight standing position.

The truck-loading device 15 makes it possible for users who are not able to jump into a truck 60 to load or unload cargo 190. This provides greater use of the truck 60 for users who are overweight, elderly, or have a physical impairment. The truck-loading device 15 also saves effort and time when loading and unloading cargo 190.

The truck-loading device 15 may include multiple framed sections, or frames 20. The frames 20 of the truck-loading device 15 are hinged together by hinges 100 in a sequence that may easily slide on the bed liner 40 of a pickup truck 60. Each frame 20 may be separately loaded and then slid back into the truck bed 30 to permit the loading of the next frame 20. In an embodiment, each frame 20 is adapted to fit in between the wheel wells of the truck 60 and may be provided in two-foot sections to fit a truck width of four-, six-, or eight-ft. bed liner 40. In an embodiment, hinges 100 link each of frames 20 to at least one other frame 20. In an embodiment, each frame 20 may include one or more connecting faces 105 along the exterior of one or more of the perimeter walls 80 along the frame length 180. The hinges 100 may pivot between the connecting faces 105 near the bottom walls 90.

The truck-loading device 15 may be sized in various embodiments to match different truck beds 30. In an embodiment, each frame 20 may have a frame depth 182 of two feet and a frame length 180 of 4 feet. In an embodiment, the truck-loading device 15 may include two frames 20 to fit a four-foot by four-foot truck bed 30. In another embodiment, the truck-loading device 15 may include three frames 20 for a four-feet by six-feet truck bed 30. In yet another embodiment, the truck-loading device 15 may include four frames 20 for a four-foot by eight-foot truck bed 30. Each embodiment may be modifiable allowing for the addition or removal of frames 20. In an embodiment, the frames 20 may have a frame depth 182 of four feet or less. If the frames 20 have a frame depth 182 greater than four feet, when a frame 20 is hanging from the tailgate 50 it may touch on the ground and drag, and thereby prevent the easy loading and unloading of the truck-loading device 15.

The perimeter walls 80 may extend upwards from the bottom walls 90 to a top side 85 at a uniform frame height 184. The frame height 184 may be sized to a height sufficient to keep cargo 190 placed in the cargo space 110 of a frame 20 from rolling or shifting, but not so high as to take up valuable cargo space 110 for other larger cargo 190 to rest on top of the frames 20. In an embodiment, the frame height 184 is between one to four inches high. The frames 20 may be flush on the top side 85 of the perimeter walls 80 as to aid in loading and unloading cargo 190 that spans across the frames 20, such as, sheets of plywood, dry wall, and paneling.

The frames 20 may be adapted to minimize the sliding contact surface between the bottom of the frames 20 and the truck bed 40 to enable a user to move cargo 190 that is six to eight feet away in the interior of the truck bed 30 to the tailgate 50 for unloading. This permits a user to unload a truck 60 with out having to "get off" his feet too unload the truck 60.

Figure 2:
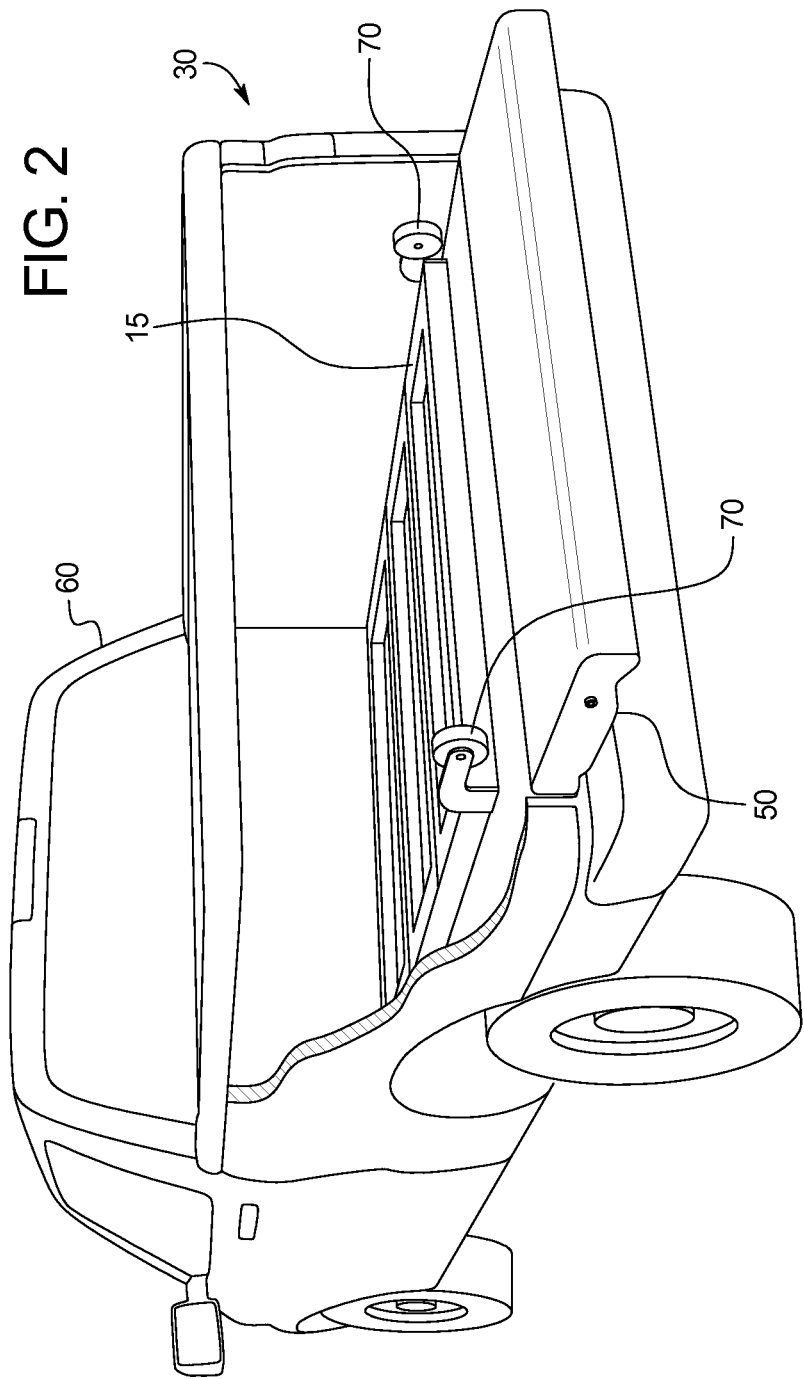
FIG. 2 illustrates the truck-loading device fully loaded in the truck bed.

FIG. 2 illustrates the truck-loading device 15 fully loaded in the truck bed 30. The truck-loading device 15 may be adapted to be compatible with a truck bed 30 that has a hard plastic corrugated bed liner 40. The hard corrugated bed liner 40 reduces friction by providing a surface with fifty percent of its surface recessed. By reducing surface area, drag and friction is reduced.

In use, the user may load cargo 190 by pulling out the truck-loading device 15 until the third frame 26 (or the rearmost frame 20 if more than three frames 20 are included) of the truck-loading device 15 is on the tailgate 50. The user may then fill the third frame 26. Once the third frame 26 is filled, the user may slide the third frame 26 into the truck bed 30 and fill the second frame 24 on the tailgate 50. The user may continue filling frames 20 until all cargo 190 is loaded or all frames 20 are loaded and moved into the truck bed 30.

The truck-loading device 15 may also include special accessories. For example, in some embodiments, the truck-loading device 15 may include buckles and strap to hold down cargo 190.

Figure 3:
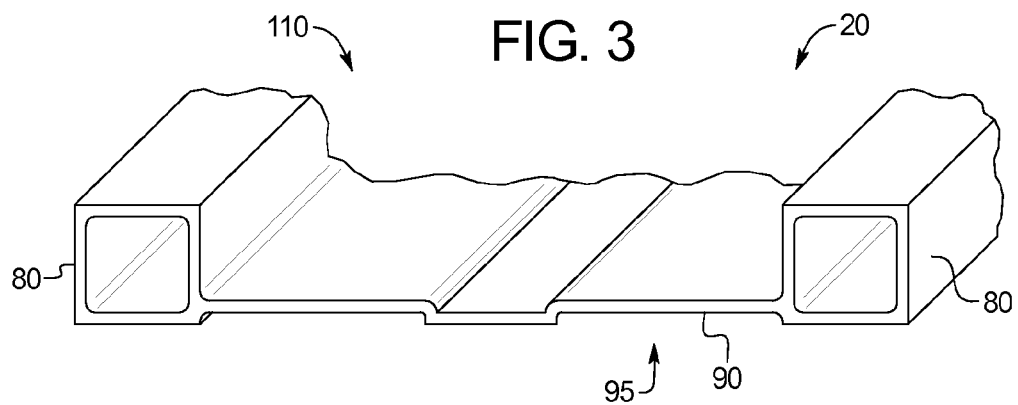
FIG. 3 is a cutaway perspective view of an embodiment of the frame.

FIG. 3 is a cutaway perspective view of an embodiment of the frame 20. In the embodiment, the frame 20 is constructed from plastic. A portion of the bottom surface 95 may be recessed to facilitate less drag. The frame 20 may include a support rib to increase the strength of the frame 20. In an embodiment, each frame 20 may include perimeter walls 80 and a bottom wall 90 that define a cargo space 110 to receive cargo 190. The perimeter walls 80 may define the shape of the frame 20. In an embodiment, the shape of the frame 20 may be rectangular.

Figure 4:
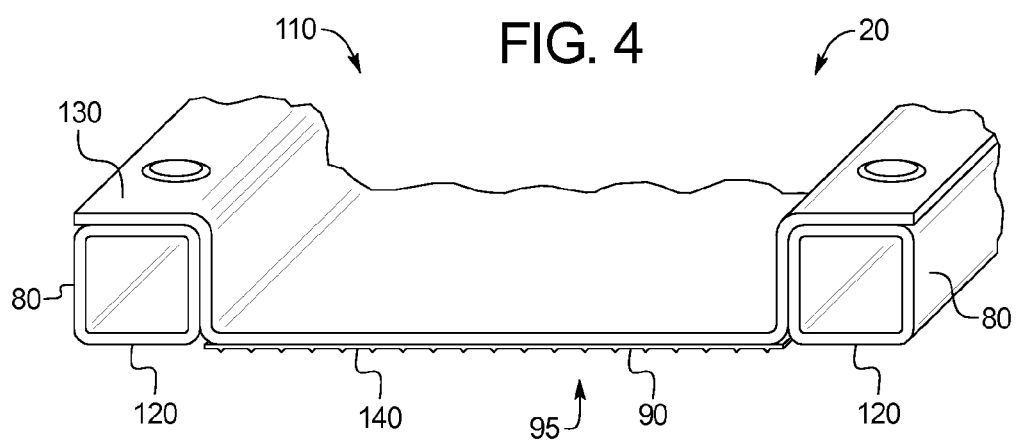
FIG. 4 is a cutaway perspective view of an embodiment of a frame constructed from metal tubes with a square cross-section.

FIG. 4 is a cutaway perspective view of an embodiment of a frame 20 constructed from metal tubes 120 with a square cross-section. In an embodiment, the frame 20 includes a plastic tray 130 that may be set inside and fastened to the metal tubes 120. The bottom surface 95 of the plastic tray 130 may include a random embossed pattern 140 that facilitates the least drag and maximum support.

Figure 5:
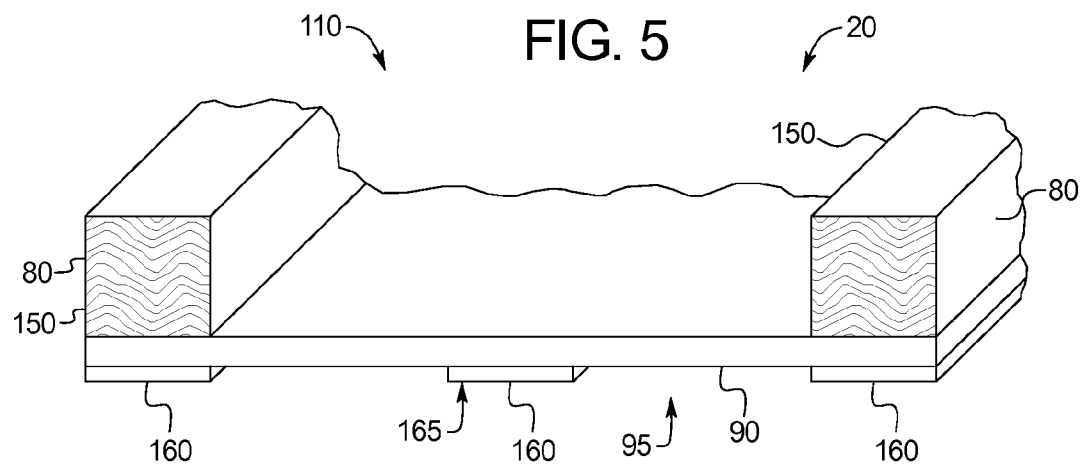
FIG. 5 is a cutaway perspective view of an embodiment of the frame constructed from wood boards.

FIG. 5 is a cutaway perspective view of an embodiment of the frame 20 constructed from wood boards 150. In the embodiment shown, the frame 20 includes linear hard plastic slats 160 attached to the bottom surface 95 of the frame 20 to permit the frame 20 to slide freely.

To reduce drag, a slat surface 165 of the plastic slat 160 may include a surface area that is less than a surface area of the bottom surface 95. Additionally, the slat surface 165 may extend along a direction of travel of the truck-loading device 15 when moving between a first configuration 210 (FIG. 7A) and a second configuration 220 (FIG. 7B).

In other embodiments, the bottom surface 95 may include disc-shaped protrusions instead of plastic slats 160. In yet further embodiments, the bottom surface 95 may include ribs. For example, in some embodiments, the bottom wall 90 includes one or more ribs extending away from the cargo space 110, wherein each rib may be elongated along the bottom wall 90 in a direction of travel. The direction of travel is the direction along which the truck-loading device 15 moves when moving between the first configuration 210 (FIG. 7A) and the second configuration 220 (FIG. 7B).

In some embodiments, the frames 20 may also be used as billboards for advertising events by hanging the first frame 22 off of the tailgate 50 with a logo or ad printed within or attached to the cargo space 110. In some embodiments, the frames 20 may include a foam interior and may be used separately as a floatation device.

Turning to FIG. 6, in an embodiment, wheels 70 (such as a caster) may be provided on the first frame 22 to facilitate the rolling motion under the tailgate 50 for use with truck beds 30 that are six-feet long or longer. The wheels 70 may extend above the plane defined by the height of the perimeter walls 90 to ensure contact with the ground when the first frame 22 is taken off the tailgate 50 during unloading. Additionally, as shown in FIG. 6, the frames 20 may include handles 170. As shown, in an embodiment, the handles 170 are defined by openings in the perimeter walls 80 along the frame length 180. The handles 170 may be provided on the interior or exterior of the perimeter walls 80.

FIGS. 7A-7C illustrates a side view of the truck-loading device 15 being used to unload cargo 190 from a truck bed 30. In the embodiment shown, the truck-loading device 15 includes a first frame 22, a second frame 24 connected to the first frame 22 by a first hinge 100, and a third frame 26 connected to the second frame 24 by a second hinge 100. Each frame 20 includes perimeter walls 80 and a bottom wall 90 that define a partially enclosed cargo space 110. The first frame 22 includes one or more wheels 70 extending beyond the perimeter walls 80 on a side of the cargo space 110 opposite to the bottom wall 90.

Starting in FIG. 7A, in a first configuration 210, the user has opened the tailgate 50, and begins pulling on the first frame 22 to pull it out onto the tailgate 50. In the first configuration 210, the first frame 22, the second frame 24, and the third frame 26 lie in parallel in the truck bed 30. After the user has unloaded the cargo 190 from the first frame 22, the truck-loading device 15 is pulled out and the first frame 22 is pulled over the tailgate 50.

Turning to FIG. 7B, in a second configuration 220, the second frame 24 and the third frame 26 lie in parallel in the truck bed 30, and the third frame 26 freely hangs over the tailgate 50, if present, or an edge of the truck bed 30, if no tailgate 50 is present. In the second configuration 220, the user may then easily unload the second frame 24.

After the second frame 24 is unloaded, the truck-loading device 15 may again be pulled further out to cause the second frame 24 to pivot and hang from the tailgate 50. The wheels 70 engage a surface below the truck and the first frame 22 rolls underneath the truck bed 30. As shown in FIG. 7C, in this third configuration 230, the first frame 22 lies in the truck bed 30, the second frame 24 hangs over the edge of the truck bed 30, and the one or more wheels 70 engage a surface below the truck bed 30. In the third configuration 230, the third frame 26 may be easily unloaded.

Similarly, to fully load the truck bed 30, the process may be reversed. The cargo 190 is first placed on the third frame 26 in its position on the tailgate 50. Once the third frame 26 is loaded, the second frame 24 is lifted up to a position parallel to the truck bed 30, using the handles 170 inside the second frame 24. The third frame 26 and the second frame 24 are then pushed into the truck bed 30 with the first frame 22 still hanging down at a ninety-degree angle to the truck bed 30. The second frame 24 is now on the tailgate 50 and may be loaded with cargo 190. The first frame 22 may then be lifted to a position parallel to the truck bed 30, and pushed onto the tailgate 50. Once the first frame 22 is loaded, the truck-loading device 15 is fully pushed into the truck bed 30, at which point the tailgate 50 may be lifted and closed.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A cargo loading system for use with a truck bed comprising:
   a first frame,
   a second frame connected to the first frame by a first hinge, and
   a third frame connected to the second frame by a second hinge;
   wherein each frame includes perimeter walls and a bottom wall that define a partially enclosed cargo space,
   wherein the first frame includes one or more wheels extending beyond the perimeter walls on a side of the cargo space opposite to the bottom wall, wherein, in a first configuration, the first frame, the second frame, and the third frame lie in parallel in the truck bed, in a second configuration, the first frame and the second frame lie in parallel in the truck bed, and the third frame freely hangs over an edge of the truck bed, and in a third configuration, the first frame lies in the truck bed, the second frame hangs over the edge of the truck bed, and the one or more wheels engage a surface below the truck bed.

2. The cargo loading system of claim 1, wherein the first frame, the second frame, and the third frame include a depth of four feet or less.

3. The cargo loading system of claim 1, wherein each wall of the perimeter walls is a length of metal tube.

4. The cargo loading system of claim 1, wherein each wall of the perimeter walls is a beam of wood.

5. The cargo loading system of claim 1, wherein one or more of the perimeter walls includes handle openings.

6. The cargo loading system of claim 1, wherein the bottom wall includes a bottom surface including an embossed pattern.

7. The cargo loading system of claim 1, wherein the bottom wall includes a bottom surface, wherein the bottom surface includes a linear slat including a slat surface parallel to the bottom surface, wherein the slat surface includes a surface area that is less than a surface area of the bottom surface, wherein the slat surface extends along a direction of travel of the cargo loading system when moving between the first configuration and the second configuration.

\* \* \* \* \*